United States Patent
Pasquero et al.

(10) Patent No.: US 8,659,569 B2
(45) Date of Patent: Feb. 25, 2014

(54) PORTABLE ELECTRONIC DEVICE INCLUDING TOUCH-SENSITIVE DISPLAY AND METHOD OF CONTROLLING SAME

(75) Inventors: Jerome Pasquero, Montreal (CA); Gil Pinheiro, Cambridge (CA); Donald Somerset McCulloch McKenzie, Waterloo (CA); Jason Tyler Griffin, Kitchener (CA); Steven Henry Fyke, Waterloo (CA); Stephanie Elizabeth McCarty, Stratford (CA)

(73) Assignee: BlackBerry Limited, Waterloo, Ontario (CA)

(*) Notice: Subject to any disclaimer, the term of this patent is extended or adjusted under 35 U.S.C. 154(b) by 55 days.

(21) Appl. No.: 13/563,943

(22) Filed: Aug. 1, 2012

(65) Prior Publication Data

US 2013/0222256 A1    Aug. 29, 2013

Related U.S. Application Data

(63) Continuation of application No. 13/485,723, filed on May 31, 2012.

(60) Provisional application No. 61/603,094, filed on Feb. 24, 2012.

(51) Int. Cl.
   *G06F 3/041*    (2006.01)

(52) U.S. Cl.
   USPC .................. 345/173; 715/773; 455/186.2

(58) Field of Classification Search
   USPC .................. 345/156–184; 341/22–34; 340/407.1–407.2; 455/186.2; 715/252, 715/788–801, 773
   See application file for complete search history.

(56) References Cited

U.S. PATENT DOCUMENTS

| | | |
|---|---|---|
| 3,872,433 A | 3/1975 | Holmes et al. |
| 4,408,302 A | 10/1983 | Fessel et al. |
| 5,261,009 A | 11/1993 | Bokser |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Croft et al. |
| 6,094,197 A | 7/2000 | Buxton et al. |

(Continued)

FOREIGN PATENT DOCUMENTS

| | | |
|---|---|---|
| CN | 101021762 A | 8/2007 |
| EP | 0844571 A2 | 5/1998 |

(Continued)

OTHER PUBLICATIONS

"Features Included in the T-Mobile G1", http://www.t-mobileg1.com/T-Mobile-G1-Features.pdf, 2009.

(Continued)

*Primary Examiner* — Liliana Cerullo
(74) *Attorney, Agent, or Firm* — Finnegan, Henderson, Farabow, Garrett & Dunner LLP

(57) ABSTRACT

A method includes displaying a first keyboard on a touch-sensitive display of an electronic device, detecting a moving touch on the first keyboard, and, as the touch moves, changing the first keyboard into a second keyboard by moving keys of the first keyboard relative to other keys of the first keyboard, from first locations, along respective key paths, to second locations on the touch-sensitive display.

20 Claims, 6 Drawing Sheets

(56) References Cited

U.S. PATENT DOCUMENTS

| | | | |
|---|---|---|---|
| 6,223,059 B1 | 4/2001 | Haestrup | |
| 6,226,299 B1 | 5/2001 | Henson | |
| 6,351,634 B1 | 2/2002 | Shin | |
| 6,646,572 B1 | 11/2003 | Brand | |
| 7,098,896 B2 | 8/2006 | Kushler et al. | |
| 7,107,204 B1 | 9/2006 | Liu et al. | |
| 7,216,588 B2 * | 5/2007 | Suess | 101/486 |
| 7,277,088 B2 | 10/2007 | Robinson et al. | |
| 7,292,226 B2 | 11/2007 | Matsuura et al. | |
| 7,382,358 B2 | 6/2008 | Kushler et al. | |
| 7,394,346 B2 | 7/2008 | Bodin | |
| 7,443,316 B2 | 10/2008 | Lim | |
| 7,479,949 B2 | 1/2009 | Jobs et al. | |
| 7,487,461 B2 | 2/2009 | Zhai et al. | |
| 7,530,031 B2 | 5/2009 | Iwamura et al. | |
| 7,661,068 B2 | 2/2010 | Lund | |
| 7,698,127 B2 | 4/2010 | Trower, II et al. | |
| 7,886,233 B2 | 2/2011 | Rainisto et al. | |
| 8,023,930 B2 | 9/2011 | Won | |
| 8,065,624 B2 | 11/2011 | Morin et al. | |
| 8,201,087 B2 | 6/2012 | Kay et al. | |
| 2002/0097270 A1 | 7/2002 | Keely et al. | |
| 2002/0154037 A1 | 10/2002 | Houston | |
| 2002/0180797 A1 | 12/2002 | Bachmann | |
| 2004/0111475 A1 | 6/2004 | Schultz | |
| 2004/0135818 A1 | 7/2004 | Thomson et al. | |
| 2004/0140956 A1 | 7/2004 | Kushler et al. | |
| 2004/0153963 A1 | 8/2004 | Simpson et al. | |
| 2005/0017954 A1 | 1/2005 | Kay et al. | |
| 2005/0024341 A1 | 2/2005 | Gillespie et al. | |
| 2005/0039137 A1 | 2/2005 | Bellwood et al. | |
| 2005/0052425 A1 | 3/2005 | Zadesky et al. | |
| 2005/0093826 A1 | 5/2005 | Huh | |
| 2005/0195173 A1 | 9/2005 | McKay | |
| 2006/0022947 A1 | 2/2006 | Griffin et al. | |
| 2006/0033724 A1 | 2/2006 | Chaudhri et al. | |
| 2006/0053387 A1 | 3/2006 | Ording | |
| 2006/0176283 A1 | 8/2006 | Suraqui | |
| 2006/0209040 A1 | 9/2006 | Garside et al. | |
| 2006/0239562 A1 | 10/2006 | Bhattacharyay et al. | |
| 2006/0253793 A1 | 11/2006 | Zhai et al. | |
| 2006/0265648 A1 | 11/2006 | Rainisto et al. | |
| 2006/0265668 A1 | 11/2006 | Rainisto | |
| 2006/0279548 A1 | 12/2006 | Geaghan | |
| 2007/0046641 A1 | 3/2007 | Lim | |
| 2007/0061753 A1 | 3/2007 | Ng et al. | |
| 2007/0150842 A1 | 6/2007 | Chaudhri et al. | |
| 2007/0156394 A1 | 7/2007 | Banerjee et al. | |
| 2007/0157085 A1 | 7/2007 | Peters | |
| 2007/0256029 A1 | 11/2007 | Maxwell | |
| 2007/0263932 A1 | 11/2007 | Bernardin et al. | |
| 2008/0100581 A1 | 5/2008 | Fux | |
| 2008/0122796 A1 | 5/2008 | Jobs et al. | |
| 2008/0126387 A1 | 5/2008 | Blinnikka | |
| 2008/0136587 A1 | 6/2008 | Orr | |
| 2008/0141125 A1 | 6/2008 | Ghassabian | |
| 2008/0158020 A1 | 7/2008 | Griffin | |
| 2008/0184360 A1 | 7/2008 | Kornilovsky et al. | |
| 2008/0189605 A1 | 8/2008 | Kay et al. | |
| 2008/0231610 A1 | 9/2008 | Hotelling et al. | |
| 2008/0259040 A1 | 10/2008 | Ording et al. | |
| 2008/0273013 A1 | 11/2008 | Levine et al. | |
| 2008/0281583 A1 | 11/2008 | Slothouber et al. | |
| 2008/0304890 A1 | 12/2008 | Shin et al. | |
| 2008/0309644 A1 | 12/2008 | Arimoto | |
| 2008/0316183 A1 | 12/2008 | Westerman et al. | |
| 2008/0318635 A1 * | 12/2008 | Yoon et al. | 455/566 |
| 2009/0002326 A1 | 1/2009 | Pihlaja | |
| 2009/0025089 A1 | 1/2009 | Martin et al. | |
| 2009/0058823 A1 | 3/2009 | Kocienda | |
| 2009/0058830 A1 | 3/2009 | Herz et al. | |
| 2009/0066668 A1 | 3/2009 | Kim et al. | |
| 2009/0077464 A1 | 3/2009 | Goldsmith et al. | |
| 2009/0085881 A1 | 4/2009 | Keam | |
| 2009/0094562 A1 | 4/2009 | Jeong et al. | |
| 2009/0125848 A1 | 5/2009 | Keohane et al. | |
| 2009/0132576 A1 | 5/2009 | Miller et al. | |
| 2009/0144667 A1 | 6/2009 | Christoffersson et al. | |
| 2009/0160800 A1 | 6/2009 | Liu et al. | |
| 2009/0167700 A1 | 7/2009 | Westerman et al. | |
| 2009/0174667 A1 | 7/2009 | Kocienda et al. | |
| 2009/0193334 A1 | 7/2009 | Assadollahi | |
| 2009/0213081 A1 | 8/2009 | Case, Jr. | |
| 2009/0228792 A1 | 9/2009 | Van Os et al. | |
| 2009/0228842 A1 | 9/2009 | Westerman et al. | |
| 2009/0247112 A1 | 10/2009 | Lundy et al. | |
| 2009/0251410 A1 | 10/2009 | Mori et al. | |
| 2009/0254818 A1 | 10/2009 | Jania et al. | |
| 2009/0259962 A1 | 10/2009 | Beale | |
| 2009/0265669 A1 | 10/2009 | Kida et al. | |
| 2009/0284471 A1 | 11/2009 | Longe et al. | |
| 2009/0295737 A1 | 12/2009 | Goldsmith et al. | |
| 2009/0307768 A1 | 12/2009 | Zhang et al. | |
| 2009/0313693 A1 | 12/2009 | Rogers | |
| 2010/0020033 A1 | 1/2010 | Nwosu | |
| 2010/0020036 A1 | 1/2010 | Hui et al. | |
| 2010/0045705 A1 | 2/2010 | Vertegaal et al. | |
| 2010/0052880 A1 | 3/2010 | Laitinen et al. | |
| 2010/0070908 A1 | 3/2010 | Mori et al. | |
| 2010/0079413 A1 | 4/2010 | Kawashima et al. | |
| 2010/0095238 A1 | 4/2010 | Baudet | |
| 2010/0115402 A1 | 5/2010 | Knaven et al. | |
| 2010/0127991 A1 | 5/2010 | Yee | |
| 2010/0131900 A1 | 5/2010 | Spetalnick | |
| 2010/0141590 A1 | 6/2010 | Markiewicz et al. | |
| 2010/0156813 A1 | 6/2010 | Duarte et al. | |
| 2010/0156818 A1 | 6/2010 | Burrough et al. | |
| 2010/0161538 A1 | 6/2010 | Kennedy, Jr. et al. | |
| 2010/0197352 A1 | 8/2010 | Runstedler et al. | |
| 2010/0199176 A1 | 8/2010 | Chronqvist | |
| 2010/0225599 A1 | 9/2010 | Danielsson et al. | |
| 2010/0235726 A1 | 9/2010 | Ording et al. | |
| 2010/0253620 A1 | 10/2010 | Singhal | |
| 2010/0257478 A1 | 10/2010 | Longe et al. | |
| 2010/0259482 A1 | 10/2010 | Ball | |
| 2010/0259561 A1 | 10/2010 | Forutanpour et al. | |
| 2010/0277424 A1 | 11/2010 | Chang et al. | |
| 2010/0287486 A1 | 11/2010 | Coddington | |
| 2010/0292984 A1 | 11/2010 | Huang et al. | |
| 2010/0295801 A1 | 11/2010 | Bestle et al. | |
| 2010/0313127 A1 | 12/2010 | Gosper et al. | |
| 2010/0313158 A1 | 12/2010 | Lee et al. | |
| 2010/0315266 A1 | 12/2010 | Gunawardana et al. | |
| 2010/0325721 A1 | 12/2010 | Bandyopadhyay et al. | |
| 2010/0333027 A1 | 12/2010 | Martensson et al. | |
| 2011/0010655 A1 | 1/2011 | Dostie et al. | |
| 2011/0018812 A1 | 1/2011 | Baird | |
| 2011/0029862 A1 | 2/2011 | Scott et al. | |
| 2011/0035696 A1 | 2/2011 | Elazari et al. | |
| 2011/0041056 A1 | 2/2011 | Griffin et al. | |
| 2011/0043455 A1 | 2/2011 | Roth et al. | |
| 2011/0060984 A1 | 3/2011 | Lee | |
| 2011/0061029 A1 | 3/2011 | Yeh et al. | |
| 2011/0063231 A1 | 3/2011 | Jakobs et al. | |
| 2011/0078613 A1 | 3/2011 | Bangalore | |
| 2011/0086674 A1 | 4/2011 | Rider et al. | |
| 2011/0090151 A1 | 4/2011 | Huang et al. | |
| 2011/0099505 A1 | 4/2011 | Dahl | |
| 2011/0099506 A1 | 4/2011 | Gargi et al. | |
| 2011/0119623 A1 | 5/2011 | Kim | |
| 2011/0148572 A1 | 6/2011 | Ku | |
| 2011/0171617 A1 | 7/2011 | Yeh et al. | |
| 2011/0179355 A1 | 7/2011 | Karlsson | |
| 2011/0193797 A1 | 8/2011 | Unruh | |
| 2011/0202835 A1 | 8/2011 | Jakobsson et al. | |
| 2011/0202876 A1 | 8/2011 | Badger et al. | |
| 2011/0209087 A1 | 8/2011 | Guyot-Sionnest | |
| 2011/0233407 A1 | 9/2011 | Wu et al. | |
| 2011/0239153 A1 | 9/2011 | Carter et al. | |
| 2011/0242138 A1 | 10/2011 | Tribble | |
| 2011/0248945 A1 | 10/2011 | Higashitani | |
| 2011/0249076 A1 * | 10/2011 | Zhou et al. | 348/14.02 |
| 2011/0256848 A1 | 10/2011 | Bok et al. | |
| 2011/0285656 A1 | 11/2011 | Yaksick et al. | |

(56) References Cited

U.S. PATENT DOCUMENTS

| | | |
|---|---|---|
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0092278 A1 | 4/2012 | Yamano |
| 2012/0110518 A1 | 5/2012 | Chan et al. |
| 2012/0117506 A1* | 5/2012 | Koch et al. ............... 715/773 |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0222255 A1* | 8/2013 | Pasquero et al. ............ 345/169 |

FOREIGN PATENT DOCUMENTS

| | | |
|---|---|---|
| EP | 0880090 | 11/1998 |
| EP | 1847917 | 10/2007 |
| EP | 1850217 A2 | 10/2007 |
| EP | 1909161 A1 | 4/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2402846 A2 | 1/2012 |
| EP | 2420925 A2 | 2/2012 |
| EP | 2431842 A2 | 3/2012 |
| JP | 2011-197782 A | 10/2011 |
| JP | 2012-68963 A | 4/2012 |
| KR | 20120030652 A | 3/2012 |
| WO | 03/029950 A2 | 4/2003 |
| WO | 03/054681 A1 | 7/2003 |
| WO | 04/001560 A1 | 12/2003 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | WO2008/057785 A2 | 5/2008 |
| WO | 2009/019546 A2 | 2/2009 |
| WO | 2010/035574 A1 | 4/2010 |
| WO | WO2010/035574 A1 | 4/2010 |
| WO | WO2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |

OTHER PUBLICATIONS

BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
European Search Report dated Feb. 28, 2011, issued in European Patent Application No. 10160590.5.
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/IB2011/003273, on Jun. 14, 2012, 8 pages.
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://supportsprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/rnessage?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action for U.S. Appl. No. 12/764,298, dated Jul. 20, 2012, 38 pages.
U.S. Office Action for U.S. Appl. No. 13/482,705, dated Aug. 7, 2012, 10 pages.
User Guide Samsung Moment(TM) with Google(TM), dated Dec. 4, 2009 (122 pages).
User Guide Samsung Moment(TM) with Google(TM), dated Mar. 2, 2010 (218 pages).
Conveniently select text, images, annotations, etc. in a PDF or any other text format on a touch based mobile/tablet device, IP.com Journal, Mar. 1, 2011, XP013142665, (10 pages).
Droid X by Motorola © 2010 Screen shots.
Droid X by Motorola © 2010 User Manual (72 pages).
Extended European Search Report dated Aug. 24, 2012, issued in European Application No. 12166115.1 (5 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
Google Mobile Help—Editing text, http://support.google.com/mobile/bin/answer.py?hl=en&answer=168926, date of access: Jun. 6, 2012 (2 pages).

(56) References Cited

OTHER PUBLICATIONS

International Search Report and Written Opinion issued in International Application No. PCT/EP2012/057944, on Oct. 12, 2012, (10 pages).
International Search Report and Written Opinion mailed Sep. 10, 2012, issued for International Application No. PCT/EP2012/057945 (11 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No. 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
European Examination Report dated Apr. 5, 2013, issued in European Application No. 12180190.6 (7 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Aug. 24, 2012, issued in European Application No. 12172458.7 (6 pages).
Extended European Search Report dated Aug. 31, 2012, issued in European Application No. 12166170.6 (7 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Apr. 4, 2013, issued in U.S. Appl. No. 13/447,835 (20 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).
Swype Product Features, accessed online at http://www.swype.com/about/specifications/ on Feb. 25, 2013 (2 pages).
U.S. Appl. No. 13/601,736, filed Aug. 31, 2012 (44 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).

* cited by examiner

PORTABLE ELECTRONIC DEVICE INCLUDING TOUCH-SENSITIVE DISPLAY AND METHOD OF CONTROLLING SAME

CROSS-REFERENCE TO RELATED APPLICATIONS

This application claims priority as a continuation of U.S. patent application Ser. No. 13/485,723, filed May 31, 2012, which claims the benefit of U.S. Provisional Patent Application 61/603,094, filed Feb. 24, 2012, which are hereby incorporated by reference in their entirety.

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
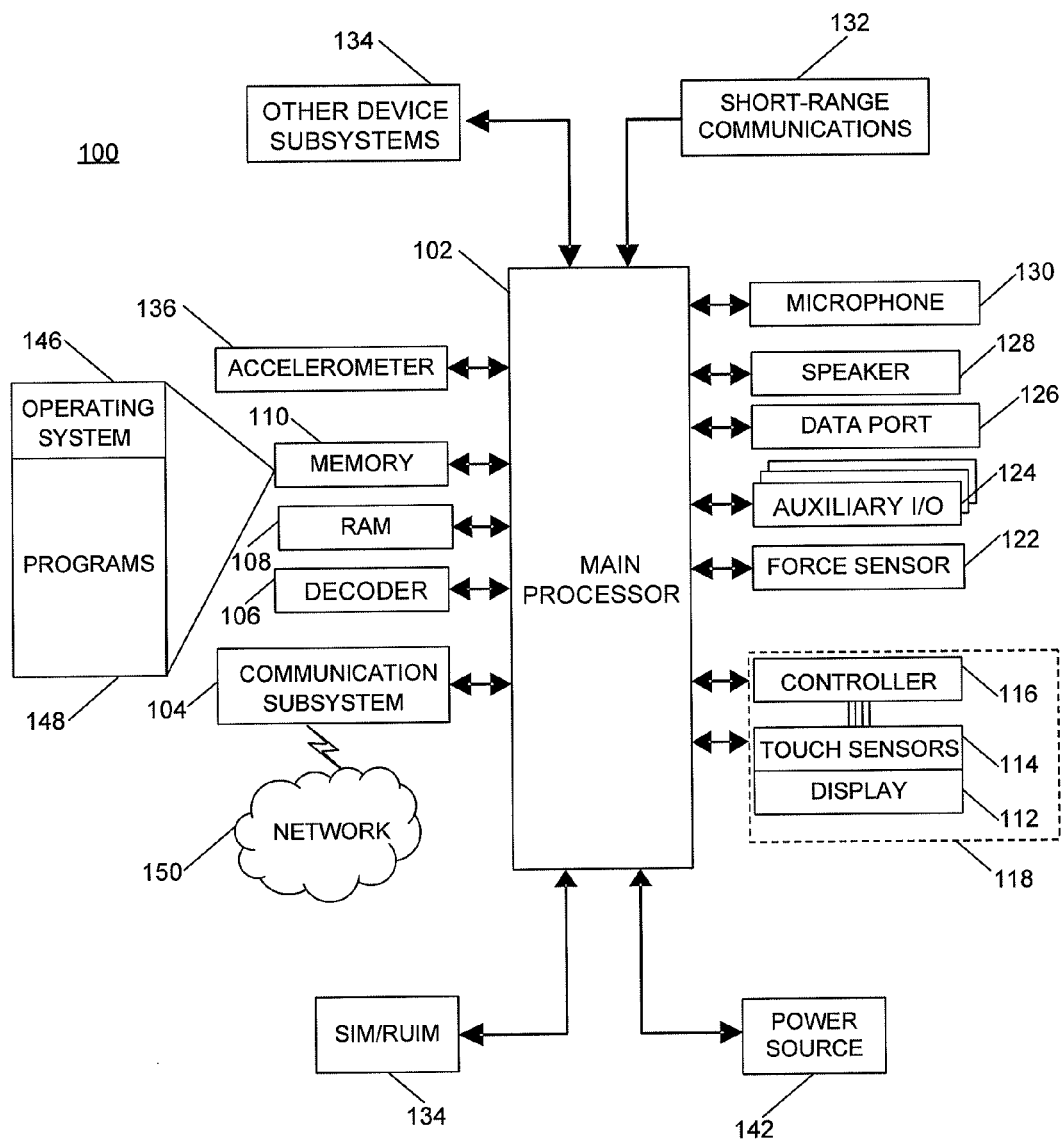
FIG. 1 is a block diagram of a portable electronic device in accordance with an example.

The following describes an electronic device and method including displaying a first keyboard on a touch-sensitive display of an electronic device, detecting a touch on the first keyboard, and when the touch is associated with a keyboard transformation function, changing the first keyboard into a second keyboard by moving keys of the first keyboard relative to other keys of the first keyboard, from first locations, along respective key paths, to second locations on the touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. Optionally, the processor may interact with one or more force sensors 122. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information associated with a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
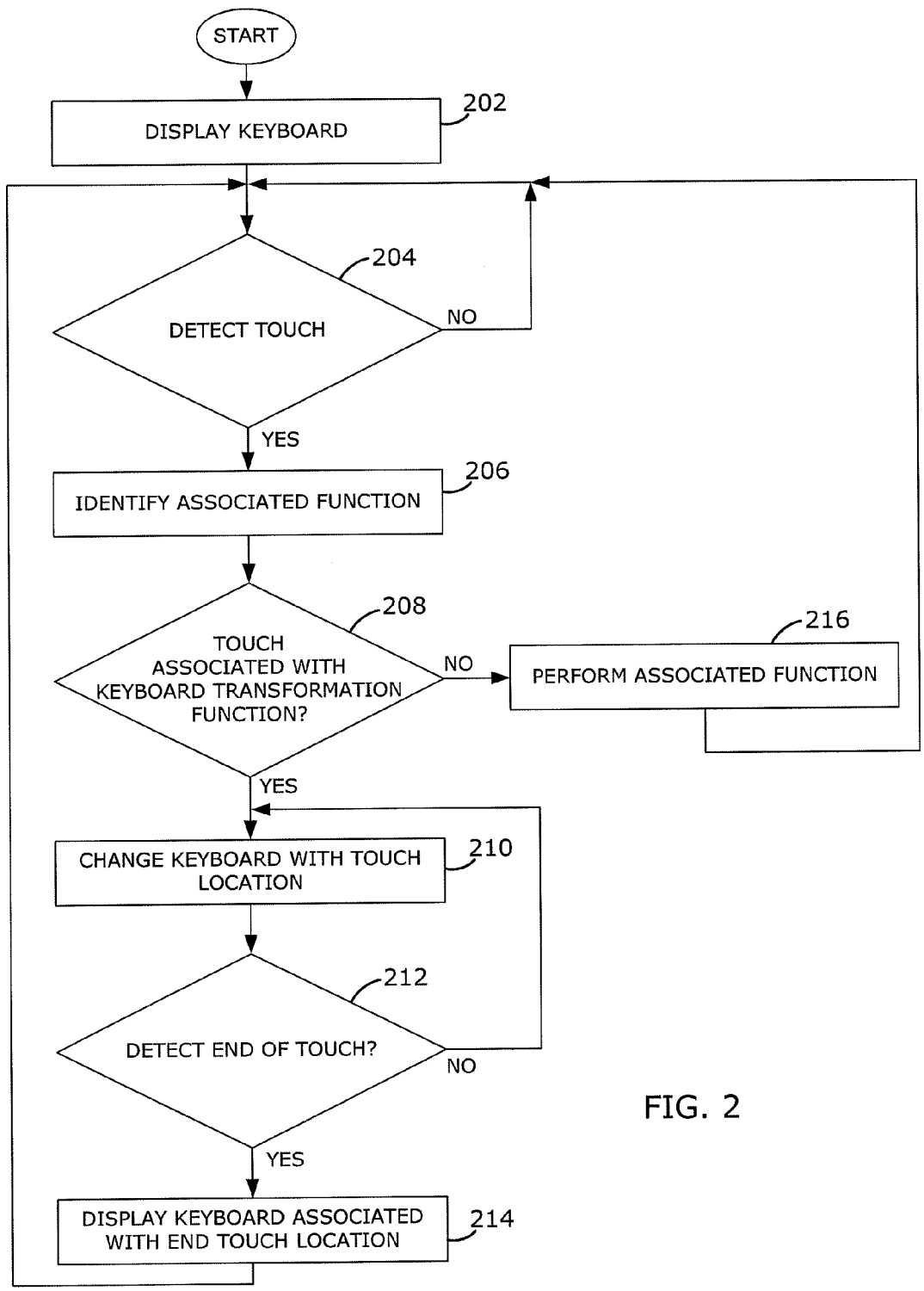
FIG. 2 is a flowchart illustrating an example of a method of changing a keyboard displayed on an electronic device.

A flowchart illustrating an example of a method of changing a keyboard displayed on an electronic device, such as the electronic device 100, is shown in FIG. 2. The method may be carried out by software executed, for example, processor 102 and/or the controller 116. Coding of software for carrying out such a method is within the scope of a person of ordinary skill in the art given the present description. The method may contain additional or fewer processes than shown and/or described, and may be performed in a different order. Computer-readable code executable by at least one controller or processor of the portable electronic device to perform the method may be stored in a computer-readable medium, such as a non-transitory computer-readable medium.

A keyboard is displayed on the touch-sensitive display 118 at 202. The keyboard may be any suitable keyboard such as a QWERTY keyboard, QWERTZ keyboard, AZERTY keyboard, and so forth. The keyboard includes a plurality of keys that are associated with characters that may be entered utilizing the keyboard. The keyboard may be displayed in any suitable application. For example, the keyboard may be displayed for composition of a message in a messaging application. The keyboard may be displayed for entry of information in a data entry field in a Web browser application. The keyboard may be displayed for entry of information in other applications, such as a calendar application, a contacts or address book application, a word processing application, or any other suitable application.

When a touch is detected on the keyboard at 204, the attributes of touch on the touch-sensitive display 118 are determined. The touch may be a gesture, a multi-touch gesture, a tap, a multi-touch tap, or any other suitable touch. The attributes include, for example, duration of a touch, number of touch contacts, direction of the touch when the touch is a gesture, and so forth.

The touch may be associated with a function and the function is identified at 206. The function that is associated with the touch is dependent on the attributes of the touch. For example a gesture on the keyboard may be associated with a keyboard transformation function to change the layout of the keys of the keyboard, for example. A tap on a location associated with one of the keys of the keyboard may be associated with entry of the character associated with the one of the keys. Another gesture, such as a swipe from a location on the keyboard, in the downward direction, may be associated with a function to hide the keyboard.

When the touch is associated with a keyboard transformation function at 208, the process continues at 210. The keyboard transformation function is a function to change the keyboard layout by changing the locations of the keys, for example, to increase the number of rows of the keyboard, to decrease the number of rows of the keyboard, to increase the number the columns, or to decrease the number of columns. Different keyboard layouts may also include greater or fewer numbers of keys. The locations of the keys are changed by moving keys of the keyboard relative to other keys of the keyboard. The keys that are moved, move along their respective key paths. For example, when increasing the number of rows of the keyboard, keys may move along a path from one row to the new row. Other keys may also move along a path from one row to another row. Still other keys may move along a path within the row. The keys of the keyboard may also be resized based on the available display width and based on the number of keys of the keyboard. Additional keys may be added when the number of rows is increased. Alternatively, keys may be removed when the number of rows is decreased.

At 210, the keys move at a rate or speed that is dependent on the speed of the gesture detected. Thus, a slow gesture may be utilized to move the keys slowly to the new locations. Alternatively, a fast gesture may be utilized to move the keys quickly. The keys move with movement of the touch such that the keys move a distance along their respective key paths based on a location of the touch. When the touch moves farther from an origin or origins of the touch, the keys move farther along their respective key paths. If the direction of the gesture is reversed such that the touch moves in the reverse direction, toward the origin point(s) of the touch, the movement of the keys may be reversed. The distance of movement of the keys may be dependent on the distance of movement of the touch until, for example, the keys are located at their respective end locations along their respective key paths. Thus, further movement of the touch may not result in further movement of the keys.

When the touch ends at 212, the keyboard associated with the last detected location of the touch is displayed 214. For example, when the touch moves a distance that does not meet a threshold, the keys may return, along their respective key paths, to their starting locations, or locations prior to the touch. When the touch moves a distance that meets or exceeds the threshold, the keys may move to end locations along their respective key paths.

The movement of the keys along their respective key paths is displayed on the touch-sensitive display 118 when the keyboard is changed. Ready identification of the new locations of keys is facilitated by displaying the movement of the keys during changing of the keyboard.

When the touch is not associated with a keyboard transformation function at 208, the process continues at 216 where a function associated with the touch is performed.

Figure 3:
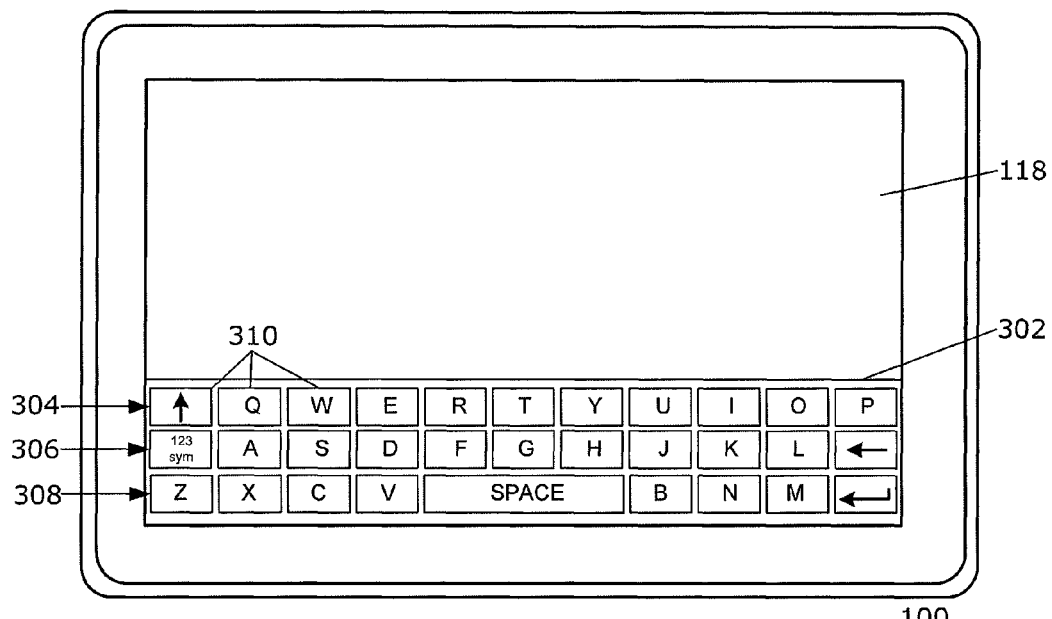
FIG. 3 through FIG. 9 are front views illustrating one example of changing a keyboard displayed on an electronic device in accordance with the method of FIG. 2.

One example of changing a keyboard displayed on an electronic device 100 is illustrated in FIG. 3 through FIG. 9 and described with continued reference to FIG. 2. In the front view of FIG. 3, a first keyboard 302 is displayed on the touch-sensitive display 118 at 202. In the example of FIG. 3, the first keyboard 302 is a QWERTY keyboard and includes three rows 304, 306, 308 of keys 310. The keys 310 of the keyboard are sized such that the rows 304, 306, 308 fit the width of the touch-sensitive display 118 when the touch-sensitive display 118 is in the landscape orientation.

A touch is detected on the keyboard at 204 and the attributes of the touch, including touch contact locations and the directions of movement on the touch-sensitive display 118 are determined. In the example illustrated in FIG. 4, the touch is a multi-touch gesture, including one touch contact beginning at the location illustrated by the circle 402 and moving upwardly in the direction illustrated by the arrow 404 and another touch contact beginning at the location illustrated by the circle 406 and moving upwardly in the direction illustrated by the arrow 408.

The touch contacts are illustrated by the circles 402, 406 in FIG. 4 through FIG. 9. The touch contacts begin at locations illustrated in FIG. 4, that are associated with the "S" and "L" keys of the keyboard 302. For the purpose of the example of FIG. 3 through FIG. 9, the "S" and "L" keys are predetermined locations on the keyboard 302, from which an upward gesture is associated with the function to change the layout of the keyboard, referred to as the keyboard transformation function, and the function is identified at 206.

In the example illustrated in FIG. 3 through FIG. 9, the keyboard transformation function is a function to change the keyboard layout by changing the locations of the keys 310, for example, to increase the number of rows of the keyboard to four rows. The keyboard is changed at 210. The change is illustrated in FIG. 5 through FIG. 9.

Figure 4:
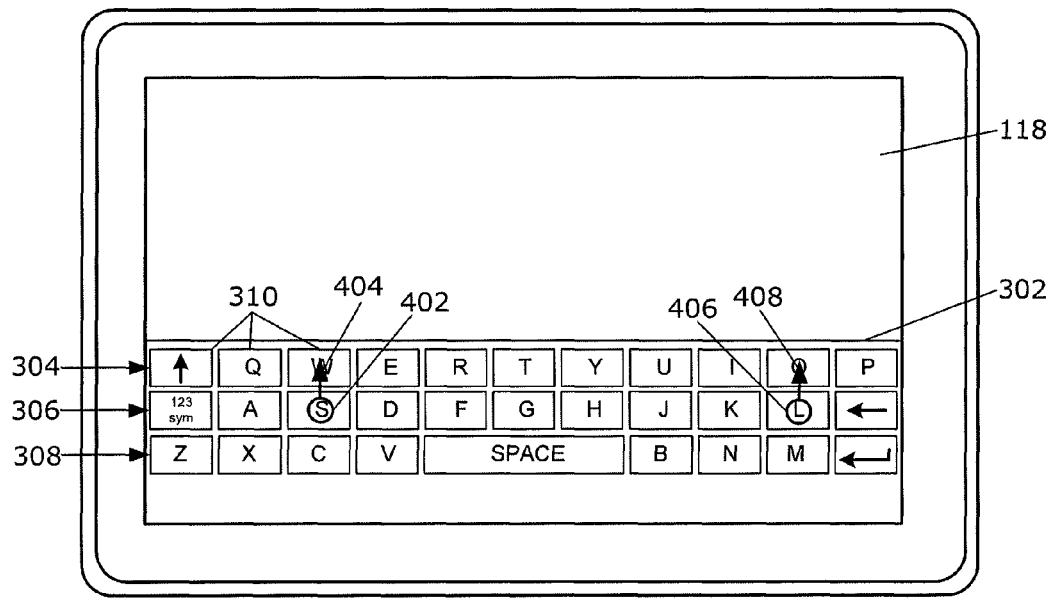
Figure 5:
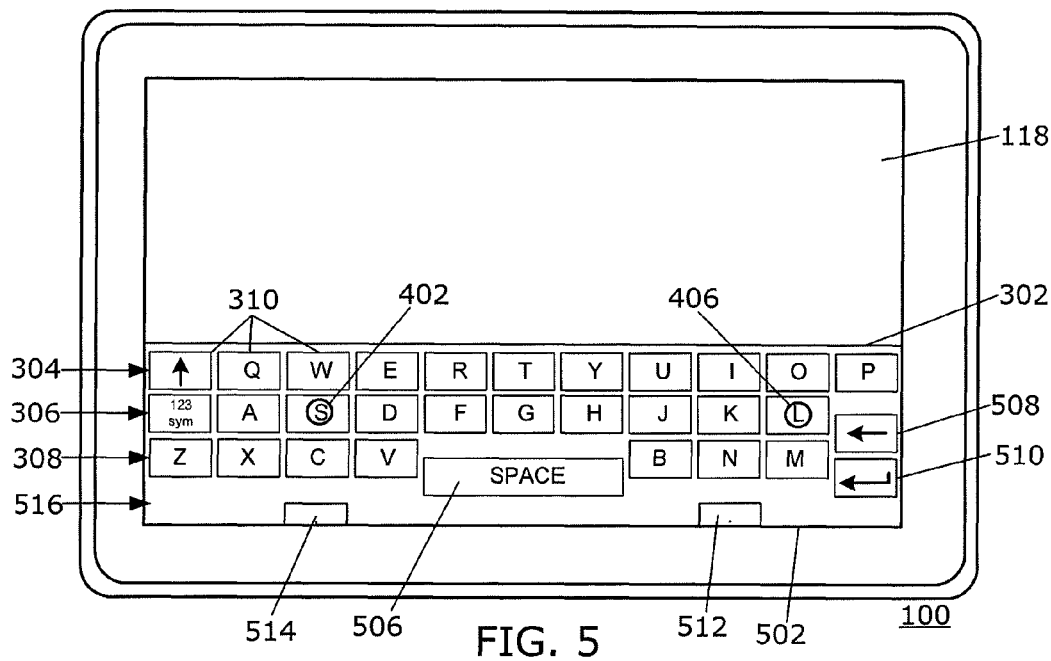

As illustrated in FIG. 5, each of the rows 304, 306, 308 of keys 310 of the keyboard 302 are moved upwardly, away from the bottom edge 502 of the display area 504 of the touch-sensitive display 118 as the touches, or locations of touch contact, move. The terms up or upwardly and down or downwardly are utilized herein to refer to directions relative to the orientation of the displayed keyboard illustrated in the figures. The rows of keys 310 are moved upwardly with the gesture such that the contact locations, illustrated by the circles 402, 406 in FIG. 4, are locations at which the keyboard 302 is grabbed to move the keys 310. The keys 310 are moved a sufficient distance from the bottom edge 502 to provide space for an additional row of keys 310.

Figure 6:
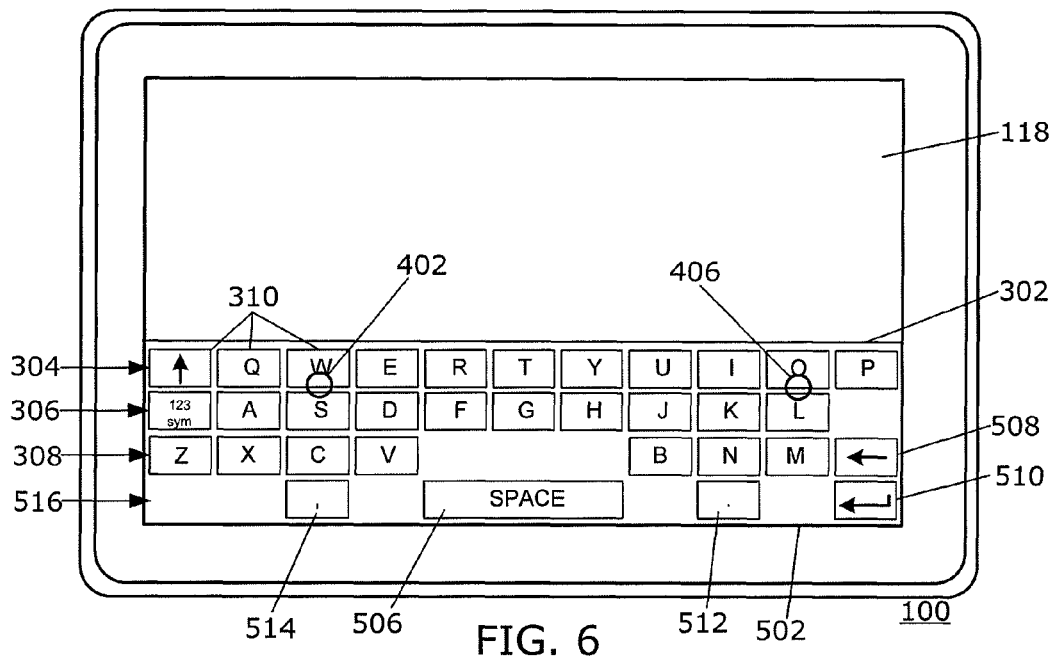

After the keys are moved away from the edge 502, keys drop back down toward the edge 502 as the locations of touch contact move. Not all the keys drop back down toward the edge as the keys move relative to each other, i.e., ones of the keys move relative to other ones of the keys. In this example, the space key 506 drops down and the backspace key 508 and return key 510 drop down such that the space key 506 and the return key 510 move along their respective key paths, to a new or fourth row, as illustrated in FIG. 5 and FIG. 6. The backspace key 508 moves from the second row 306 to the third row 308. Two new keys, including the period, or "." key 512 and the comma, or "," key 514 are added. The two new keys are added to the new, or fourth row 516 of keys. The new keys are displayed as entering the display area of the touch-sensitive display 118, from the bottom edge 502.

Figure 7:
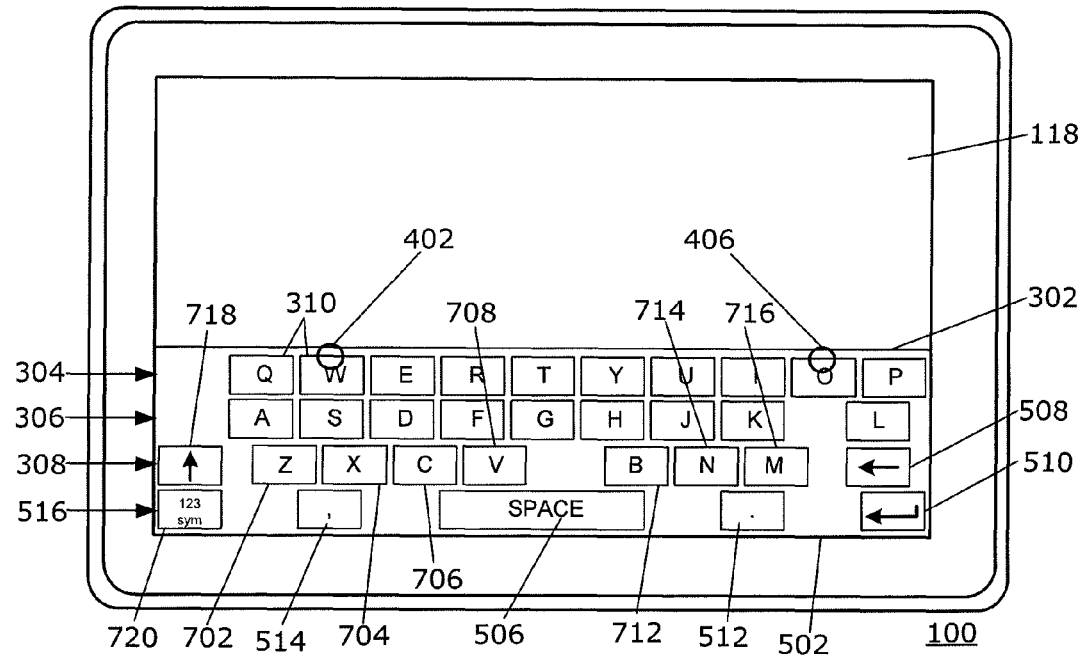

Movement of the space bar to the fourth row 516 provides additional space in the third row 308. As the locations of touch contact continue to move, the keys in the third row 308 are moved along their respective key paths to new locations in the third row, to utilize the space, as illustrated in FIG. 7. The "Z" key 702, the "X" key 704, the "C" key 706, and the V" key 708 move to the right such that the "Z" key 702 moves away from the left edge 710 of the display area 504 to leave a space between the left edge 710 and the "Z" key 702. The "B" key 712, the "N" key 714, the "M" key 716, and the backspace key 508 move along respective key paths to new location in the third row 308 to utilize the space left after movement of the space key 506. Keys in the second row 306 may also be moved along their respective key paths to new locations in the second row to utilize the space left after movement of the backspace key 508.

Additionally, the shift key 718 and a key 720 that is associated with a numeric/symbolic keyboard are moved down along their respective key paths such that the key 718 associated with the numeric/symbolic keyboard is moved to the fourth row 516 and the shift key 720 is moved from the second row 306 to the third row 308.

Figure 8:
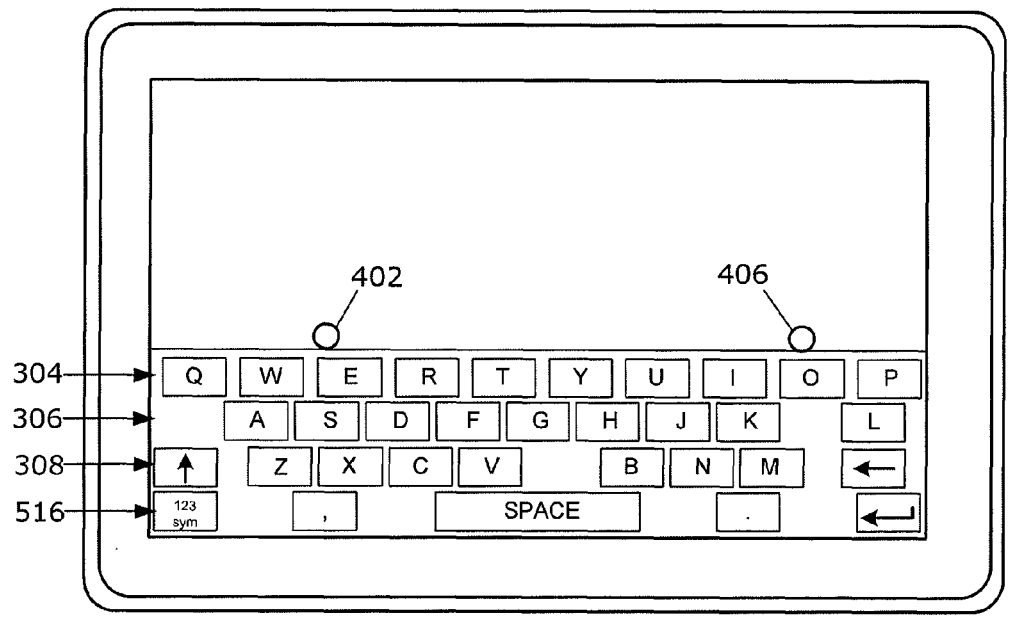
Figure 9:
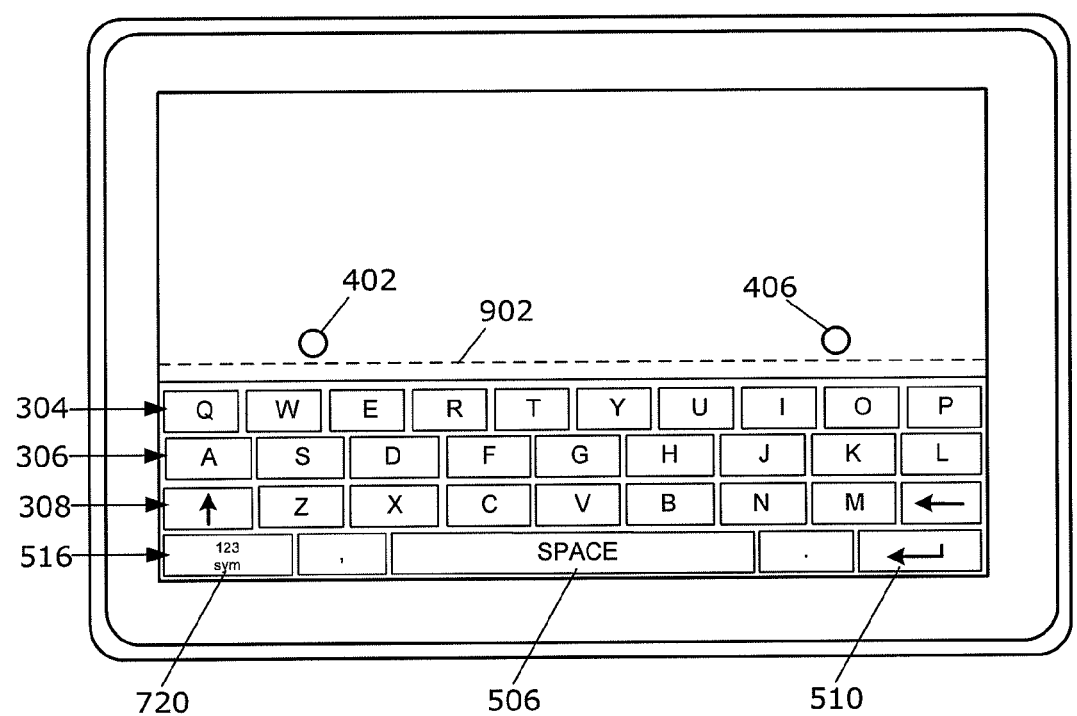

As the locations of touch contact move further, the keys in the first row 304 are moved along their respective key paths to space the keys along the first row 304, as illustrated in FIG. 8. Each of the keys is resized by changing the width of the keys such that the keys are spaced along and generally fill the width of the display area, with small spaces between the keys, as illustrated in FIG. 9, which shows the second keyboard. As illustrated, the key widths in the second keyboard are not all equal. The keys in the first row 304, for example, are not as wide as the keys in the second row 306 and the third row 308. The fourth row 516 includes keys of greater width than the remaining keys, including the space key 506, the return key 510, and the key 720 associated with the numeric/symbolic keyboard.

When the touch ends, the last detected locations of touch contact are beyond a threshold distance, as illustrated by the dashed line 902. Thus, the second keyboard is maintained on the touch-sensitive display 118 when the touch ends.

When a touch ends at locations that are a distance that does not meet the threshold, e.g., are located below the line 902 illustrated in FIG. 9, the keys return, along their respective key paths, to the three row keyboard illustrated in FIG. 3. A multi-touch gesture, such as the gesture illustrated by the circles 402, 406 in FIG. 4 through FIG. 9, may meet the threshold when one or when both touches meet or extend beyond or above the line 902. Alternatively, a multi-touch gesture may be determined to meet the threshold when both touches meet or extend above the line 902.

In the example described above with reference to FIG. 3 through FIG. 9, a first keyboard that includes three rows of keys is changed to a second keyboard that includes four rows of keys. The keyboard may include other rows of keys and more rows of keys may be added. The number of rows may also be reduced, for example, from four to three rows.

The method is not limited to the portable electronic device illustrated in the examples. The method may be applied utilizing other electronic devices. The method may also be applied to a keyboard displayed in a portrait orientation.

A method includes displaying a first keyboard on a touch-sensitive display of an electronic device, detecting a touch on the first keyboard, and when the touch is associated with a keyboard transformation function, changing the first keyboard into a second keyboard by moving keys of the first keyboard relative to other keys of the first keyboard, from first locations, along respective key paths, to second locations on the touch-sensitive display.

An electronic device includes a touch-sensitive display and at least one processor coupled to the touch-sensitive display and configured to display a first keyboard on the touch-sensitive display, detect a touch on the first keyboard, and when the touch is associated with a keyboard transformation function, change the first keyboard into a second keyboard by moving keys of the first keyboard relative to other keys of the first keyboard, from first locations, along respective key paths, to second locations on the touch-sensitive display.

More rows may be added to a keyboard such that additional keys may be added to increase the number of characters that may be entered utilizing the keyboard, and/or to increase the size of keys of the keyboard to facilitate selection of the keys. Alternatively, keys may be removed when the number of rows is decreased or the size of keys may be decreased. The movement of the keys along their respective key paths is displayed on the touch-sensitive display when the keyboard is changed. Ready identification of the new locations of keys is facilitated by displaying the movement of the keys during changing of the keyboard. The user may control the movement of the keys, for example, by controlling the speed. A user may also reverse the movement of the keys by reversing the direction of movement of the touch. Thus, the user may follow the movement of the keys to their new locations.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    displaying a first keyboard on a touch-sensitive display of an electronic device;
    detecting a moving touch associated with the first keyboard; and
    as the touch moves, changing the first keyboard into a second keyboard by moving keys of the first keyboard from first locations, along a plurality of directions based on respective key paths, to second locations on the touch-sensitive display, wherein:
        the keys of the first keyboard move at a rate based on the speed of the moving touch,
        changing the first keyboard into the second keyboard changes spacing between the keys of the first keyboard as compared with the second keyboard, and
        a space is provided to display an additional key row while displaying all keys of the first keyboard.

2. The method according to claim 1, wherein the moving touch comprises a moving multi-touch.

3. The method according to claim 1, wherein the moving touch comprises a moving touch beginning at a predetermined location for changing the first keyboard.

4. The method according to claim 1, wherein changing comprises resizing the keys.

5. The method according to claim 4, wherein resizing the keys comprises changing a width of the keys.

6. The method according to claim 5, wherein the width of the keys is changed based on the available display width.

7. The method according to claim 1, wherein the keys are arranged in rows and changing the keyboard comprises:
    moving at least one of the keys from one of the rows to another of the rows; and
    changing the number of keys included in at least one or more of the rows.

8. The method according to claim 1, wherein the moving touch comprises a gesture in a first direction, beginning on the first keyboard and wherein the keys are moved in the first direction to provide a space for the additional key row.

9. The method according to claim 8, wherein ones of the keys move back in a second direction opposite the first direction, into the additional key row, after being moved in the first direction.

10. The method according to claim 9, wherein changing comprises resizing the keys after the ones of the keys are moved into the additional key row.

11. The method according to claim 9, wherein others of the keys are moved in a third direction different from both the first direction and the second direction after the ones of the keys are moved.

12. The method according to claim 8, wherein further keys that were not included in the first keyboard are added to the additional key row.

13. The method according to claim 1, wherein the moving touch comprises a gesture in a direction beginning on the first keyboard to remove a key row.

14. The method according to claim 1, wherein the moving touch comprises a gesture beginning on the first keyboard to add or remove a key row.

15. The method according to claim 1, wherein a distance of movement of the keys along respective key paths is based on a distance of movement of the touch.

16. The method according to claim 15, further comprising: while detecting a moving touch associated with the first keyboard, reversing movement of the keys along their respective key paths in response to a change in direction of movement of the touch.

17. The method according to claim 1, comprising detecting an end of the touch and displaying one of the first keyboard and the second keyboard associated with a last-detected location of the touch.

18. The method according to claim 1, comprising detecting an end of the touch and displaying the first keyboard again when the distance moved by the moving touch does not meet a threshold.

19. The method according to claim 18, wherein displaying the first keyboard again comprises moving the keys back along their respective key paths to their starting locations.

20. The method according to claim 18, comprising displaying the second keyboard when the distance moved by the moving touch meets the threshold.

* * * * *